(12) United States Patent     (10) Patent No.: US 12,597,302 B2
Lyons     (45) Date of Patent: Apr. 7, 2026

(54) AIR PRESSURE LIMITING VALVE DIAGNOSTIC SYSTEMS AND METHODS

(71) Applicant: International Engine Intellectual Property Company, LLC, Lisle, IL (US)

(72) Inventor: Timothy M. Lyons, Batavia, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 135 days.

(21) Appl. No.: 18/589,549

(22) Filed: Feb. 28, 2024

(65) Prior Publication Data

US 2025/0273022 A1     Aug. 28, 2025

(51) Int. Cl.
G07C 5/08 (2006.01)
B60T 17/22 (2006.01)

(52) U.S. Cl.
CPC ............ G07C 5/0808 (2013.01); B60T 17/22 (2013.01); *B60T 2260/09* (2013.01); *B60T 2270/406* (2013.01)

(58) Field of Classification Search
CPC ... G07C 5/0808; B60T 17/22; B60T 2260/09; B60T 2270/406
See application file for complete search history.

(56) References Cited

U.S. PATENT DOCUMENTS

| | | | |
|---|---|---|---|
| 4,926,331 | A | 5/1990 | Windle et al. |
| 6,263,269 | B1 | 7/2001 | Dannenberg |
| 6,313,742 | B1 | 11/2001 | Larson |
| 6,650,977 | B2 | 11/2003 | Miller |
| 6,732,026 | B2 | 5/2004 | Fleming et al. |
| 6,928,358 | B2 | 8/2005 | Brooks et al. |
| 7,363,127 | B2 | 4/2008 | Fogelstrom |
| 7,430,464 | B2 | 9/2008 | Bell et al. |
| 8,150,576 | B2 | 4/2012 | Ptak et al. |
| 2013/0054085 | A1 | 2/2013 | Casey |
| 2014/0107887 | A1 | 4/2014 | Bissontz |
| 2016/0178470 | A1* | 6/2016 | Ge ...................... G01M 15/106 |
| | | | 73/1.57 |

FOREIGN PATENT DOCUMENTS

| | | |
|---|---|---|
| CN | 114352401 | 4/2022 |
| EP | 2080999 | 7/2009 |

OTHER PUBLICATIONS

Eriksson, Axel. "Detecting Leakages in the Pneumatic System of Heavy Vehicles—Modelling Using Simulink," Ångström Laboratory, Uppsala University, https://uu.diva-portal.org/smash/get/diva2:376906/FULLTEXT01.pdf, published Dec. 30, 2010. (85 pages).

* cited by examiner

*Primary Examiner* — Rami Khatib
(74) *Attorney, Agent, or Firm* — Umang Khanna

(57) ABSTRACT

Diagnostic systems and methods utilize existing sensors on an engine and/or within a vehicle to detect and/or diagnose malfunctions or failures with an air pressure limiting valve. By analyzing and comparing in-vehicle and on-engine sensors data, as well as engine control maps, malfunctions and/or failures to the air pressure limiting valve and/or leaks in the air flow within the air pressure system are detectable.

9 Claims, 2 Drawing Sheets

AIR PRESSURE LIMITING VALVE DIAGNOSTIC SYSTEMS AND METHODS

TECHNICAL FIELD

Diagnostic systems and methods utilize existing sensors on an engine or otherwise within a vehicle to detect and diagnose malfunctions or failures with an air pressure limiting valve. By analyzing and comparing in-vehicle and on-engine sensors data, as well as engine control maps, malfunctions and/or failures to the air pressure limiting valves and/or leaks in the air flow within the air pressure system are detectable.

BACKGROUND

Vehicles, typically vehicles equipped with CBE-1 engines and/or the GW transmissions utilize air pressure flow from the vehicle air brake system to shift the transmission as well as control the engine-mounted EGR valve, the turbo wastegate, and/or the thermal management valve.

However, the typical vehicle air brake system air pressure levels exceed the capability of the aforementioned components. As a result, an air pressure limiting valve and connected tubing are utilized to reduce the air pressure from the vehicle air brake system to acceptable levels, namely levels that can be utilized by the components and systems without causing damage to the same.

FIG. 1 illustrates a prior art illustration showing an air pressure limiting valve that accepts and limits high air pressure and airflow from a vehicle brake system and routes resultant low air pressure and airflow to a vehicle's transmission and to the vehicle's engine, which may include, for example, the engine mounted EGR valve, the turbo wastegate, and/or the thermal management valve.

Malfunctions or failures in the air pressure limiting valve and/or air leaks within the airflow system can lead to poor vehicle performance, reduced durability, and may jeopardize engine emissions compliance. However, detecting malfunctions and/or failures in the air pressure limiting valve or air leaks within the airflow system is often difficult without additional sensors, such as, for example, a sensor on the air pressure limiting valve. A vehicle typically already has many sensors in various locations throughout the vehicle's engine and/or transmission. Utilizing an additional sensor on the air pressure limiting valve can be cost prohibitive and complex, may not operate effectively, and may not prove to be cost-effective.

A need, therefore, exists for improved air pressure limiting valve diagnostic systems and methods. Specifically, a need exists for systems and methods for diagnosing malfunctions and/or failures within an air pressure limiting valve that is utilized in vehicles. Moreover, a need exists for improved systems and methods for diagnosing air leaks within air pressure systems within said vehicles.

Moreover, a need exists for improved air pressure limiting valve diagnostic systems and methods that utilize existing vehicle infrastructure, such as existing vehicle sensors, to diagnose malfunctions and/or failures within an air pressure limiting valve and or for detecting air leaks within air pressure systems. Specifically, a need exists for utilizing existing sensors, such as existing vehicle air pressure sensors, transmission shift time, duty cycle signal to the turbo wastegate actuator, EGR valve sensors, thermal management valve sensors, and turbo speed sensors. Moreover, a need exists for improved air pressure limiting valve diagnostic systems and methods that further utilize engine control maps, such as the duty cycle to establish a specific turbo operating point, may be compared to an optimized condition or an early-in-life condition.

SUMMARY

One embodiment of a method for determining a malfunction or failure of an air pressure limiting valve within a vehicle. The method comprises the steps of: providing an air pressure system comprising an air pressure limiting valve and providing a plurality of sensors within an engine or transmission of the vehicle, wherein a first sensor of the plurality of sensors measures a shift time, wherein a second sensor of the plurality of sensors measures a turbo wastegate duty cycle, and wherein a third sensor of the plurality of sensors measures a turbo speed, wherein a malfunction condition is detected in the air pressure limiting valve of the vehicle using the first sensor, the second sensor, and the third sensor of the plurality of sensors within the vehicle.

DETAILED DESCRIPTION

Diagnostic systems and methods utilize existing sensors on engines and/or vehicles to diagnose malfunctions or failures within a vehicle's air pressure limiting valve and/or air pressure system. By analyzing and comparing in-vehicle and on-engine sensors data, as well as engine control maps, malfunctions and/or failures to the air pressure limiting valve system and/or leaks in the air flow within the air pressure system.

Many vehicles, such as some currently produced Navistar® vehicles, utilize a CBE-1 engine ("common base engine 1") and/or a GW transmission from Scania®. Vehicles such as these and others may utilize air pressure and flow from the vehicle brake system in other various parts and systems within the vehicle.

For example, air pressure and airflow may be utilized to shift the transmission and/or to control the engine mounted EGR valve, the turbo wastegate, and the thermal management valve. Because air pressure and airflow may be too high to safely utilize in these other components and systems, an air pressure limiting valve may be used to control and limit the air pressure from the vehicle brake system to route the same to the other components and systems.

Malfunctions in the air pressure limiting valve or air leaks within the air pressure system can result in poor vehicle performance, reduced durability, and may jeopardize engine emissions compliance. Further, malfunctions in the air pressure limiting valve may lead to dangerously high air pressure that may cause damage to other components and systems within the vehicle.

Existing sensors and/or engine control maps may be utilized to indirectly detect and/or diagnose a malfunction and/or failure within the air pressure limiting valve and/or an air leak within the air pressure system within a vehicle. Specifically, such sensors may include but are not limited to: existing vehicle air pressure sensors, sensors for detecting transmission shift time (such as, the elapsed time to complete a gear shift), sensors for determining a duty cycle signal to the turbo wastegate actuator, EGR valve sensors, thermal management valve sensors, and/or turbo speed sensors. In addition, engine control maps, such as the duty cycle needed to establish a specific turbo operating point, including, for example, speed, pressure ratio, and/or expansion ratio) may be compared to a map of an optimized condition or to an early-in-life condition where the system is known to have been operating correctly.

Figure 1:
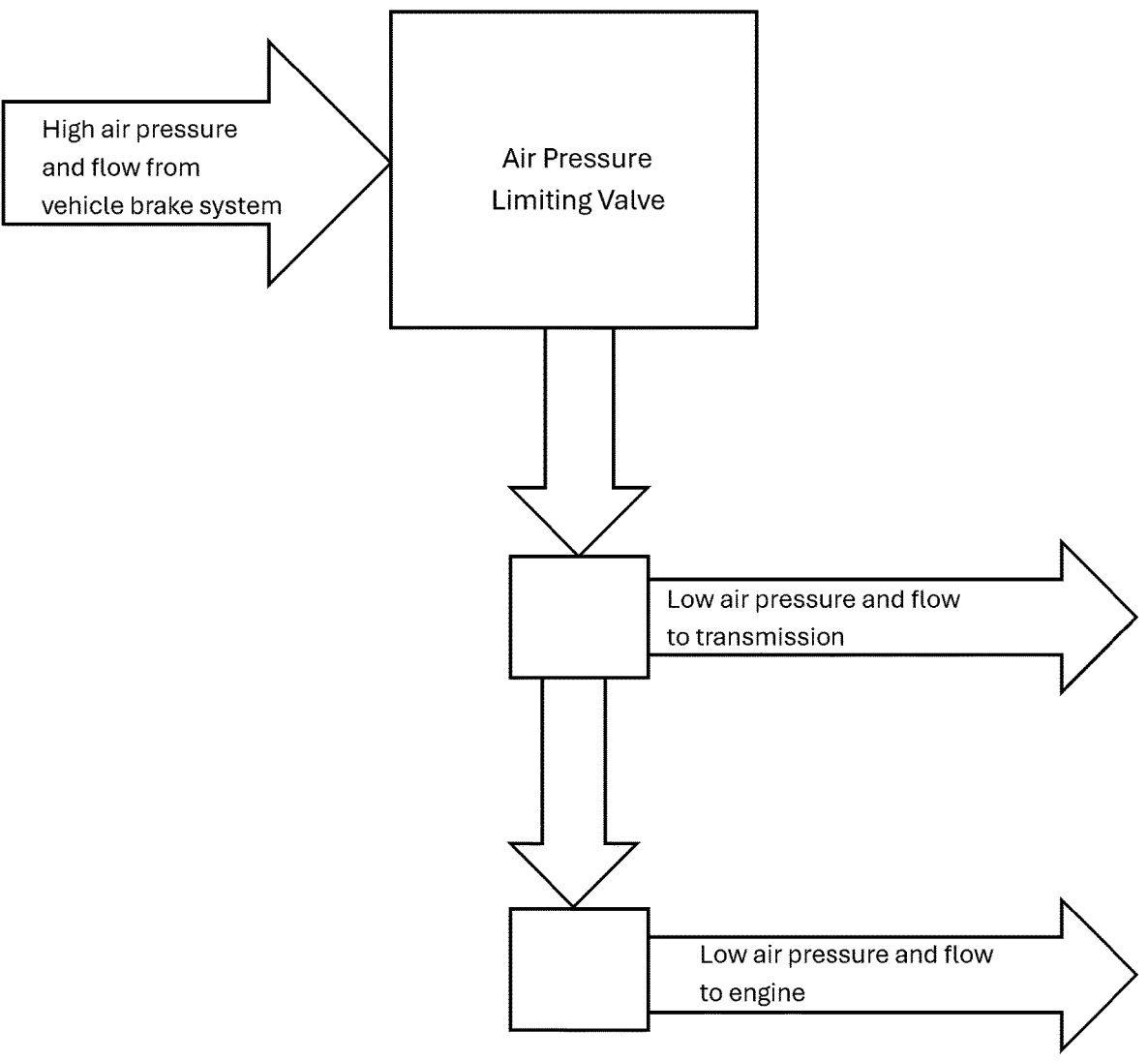
FIG. 1 is a diagram illustrating a prior art air flow system for a vehicle.
Figure 2:
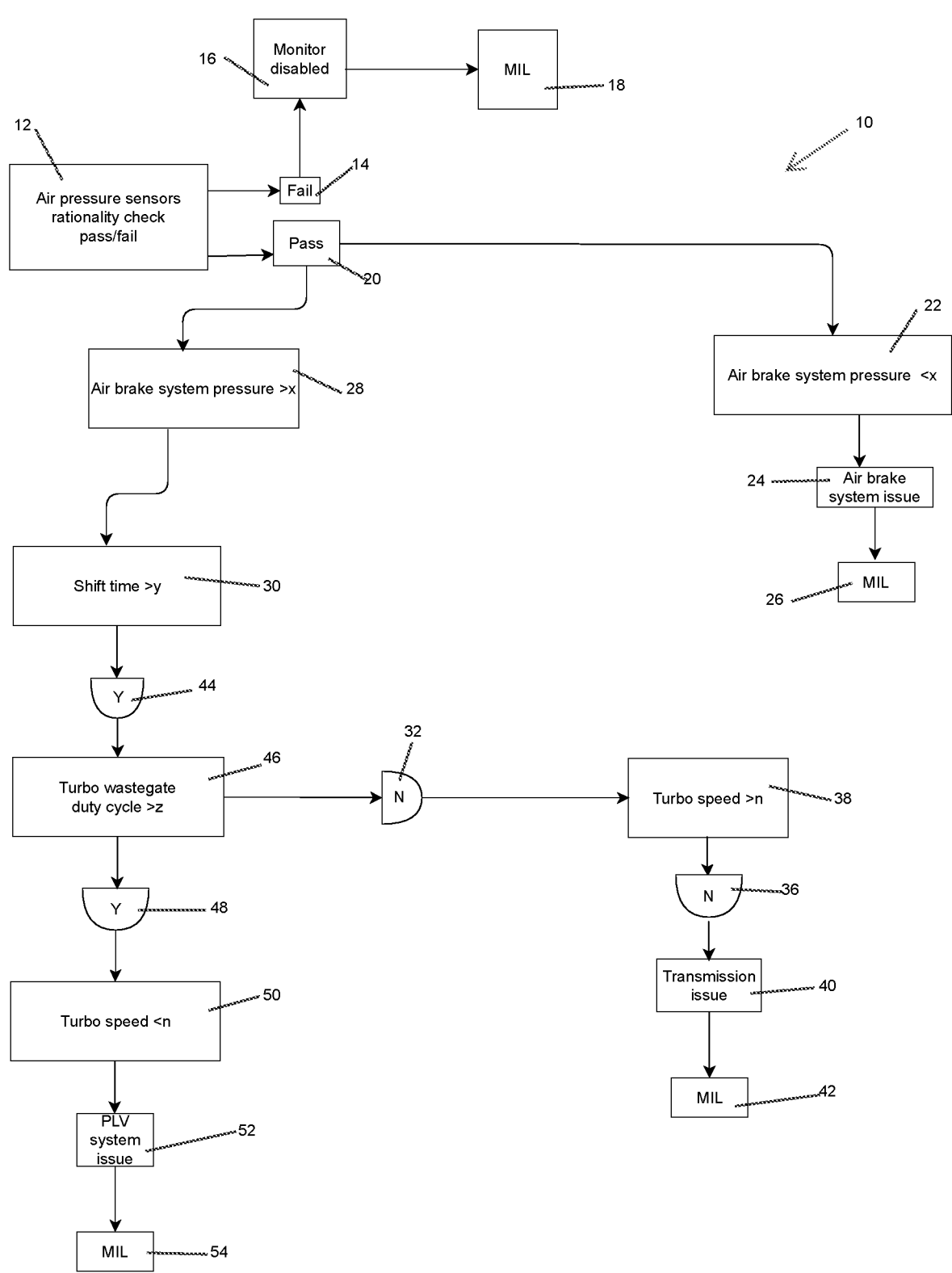
FIG. 2 is a flow chart diagram illustrating a methodology for diagnosing malfunctions and/or failures in various systems within a vehicle, and specifically for detecting malfunctions and/or failures within an air pressure limiting valve and/or air pressure system within the vehicle.

FIG. 2 illustrates an exemplary embodiment of a methodology 10 for detecting and/or identifying a malfunction or failure condition of an air pressure limiting valve system. Specifically, the methodology 10 may utilize a software application resident on a computing system for obtaining measurements from a plurality of existing sensors within a vehicle, such as on a vehicle's engine and/or transmission. The methodology may include a series of steps that may differentiate an air pressure limiting valve malfunction and/or failure or failures of individual components directly measured by the plurality of sensors. Specifically, in a first step 12, an "Air pressure sensors rationality check pass/fail" step may determine whether the existing air pressure sensors within a vehicle pass or fail. If they fail, via step 14, then it may be apparent that the monitors are disabled for some reason via step 16 and may therefore trigger a "malfunction indicator light" (MIL) indicating that said monitors are disabled via step 18.

If, during step 12 the "Air pressure sensors rationality check pass/fail" indicates a pass condition, via step 20, then the air brake system pressure may be measured and tracked via one or more existing air brake system pressure sensors. If the air brake system pressure is less than a certain specified and predefined amount (x) via step 22, then it may be apparent that a malfunction or failure may exist in the vehicle's air brake system overall via step 24, leading to a MIL indicating said air brake system issue via step 26.

If step 12 indicates a pass condition via step 20 and the air brake system pressure of the vehicle that is measured and tracked via the exemplary system and method described herein is greater than the certain specified and predefined amount (x) via step 28, then the system and method described herein may measure and track the shift time of the vehicle via one or more existing shift time sensors to determine if the shift time of the vehicle is greater than a specified and predefined (y) via step 30. If the shift time of the vehicle has a value greater than the specified and predefined amount y, then the system and method described herein may measure and track, via the one or more existing turbo wastegate duty cycle sensors, the turbo wastegate duty cycle of the vehicle via step 46. If the turbo wastegate duty cycle of the vehicle is greater than the specified and pre-define amount (z), then the turbo speed of the vehicle may be measured and tracked via step 50 via the one or more turbo speed sensors. If the turbo speed of the vehicle is less than a specified and predefined amount (n), then the system and method described herein may conclude that there is a malfunction or failure in the vehicle's air pressure limiting valve system via step 52 and may activate an MIL indicating said air pressure limiting valve failure or malfunction via step 54.

Referring back to step 46, if the turbo wastegate duty cycle of the vehicle is not greater than the specified and predefined time (z), as specified in step 32, then the turbo speed of the vehicle may be tracked and measured by the system and method described herein via step 38 via one or more existing turbo speed sensors. If the turbo speed of the vehicle is not greater than a specified and predefined amount (n), as specified in step 36, then the system and method described herein may conclude that there is a transmission issue, malfunction, or failure via step 40 (instead of concluding that there is an issue with the vehicle's pressure limiting valve) and may activate an MIL indicating said transmission issue via step 42.

I claim:

1. A method for determining a malfunction or failure of an air pressure limiting valve within a vehicle comprising the steps of:
   providing an air pressure system comprising an air pressure limiting valve;
   a computing system operatively coupled to the air pressure system;
   providing a plurality of sensors within an engine or transmission of the vehicle, wherein a first sensor of the plurality of sensors measures a shift time, wherein a second sensor of the plurality of sensors measures a turbo wastegate duty cycle, and wherein a third sensor of the plurality of sensors measures a turbo speed,
   wherein a malfunction condition is detected in the air pressure limiting valve of the vehicle when the first sensor measures a shift time greater than a first predetermined amount, the second sensor measures a turbo wastegate duty cycle greater than a second predetermined amount, and the third sensor of the plurality of sensors measures a turbo speed greater than a third predetermined amount within the vehicle; and
   activating a failure indicator indicating the pressure limiting valve failure or malfunction.

2. The method of claim 1 wherein the air pressure limiting valve directs reduced pressure from a vehicle braking system to a plurality of components within the vehicle's engine or transmission.

3. The method of claim 1 wherein the air pressure limiting valve directs reduced pressure from a vehicle braking system to the engine of the vehicle, to the transmission of the vehicle, or to both the engine and the transmission of the vehicle.

4. The method of claim 1 wherein when the first sensor of the plurality of sensors measures the shift time less than the first amount,
   wherein when the second sensor of the plurality of sensors measures the turbo wastegate duty cycle less than the second amount, and
   wherein when the third sensor of the plurality of sensors measures the turbo speed less than the third amount,
   then a failure indicator indicates that there is a failure in the vehicle's transmission.

5. The method of claim 1 further comprising the step of:
   providing a fourth sensor of the plurality of sensors wherein the fourth sensor measures an air brake system pressure of the vehicle.

6. The method of claim 5 wherein when the fourth sensor measures the air brake system pressure of the vehicle less than a fourth amount, then a failure indicator is communicated indicating that there is a failure in the air brake system.

7. The method of claim 1 comprising the step of: performing a rationality check on air pressure sensors within the air pressure system of the vehicle.

8. The method of claim 7 wherein if the rationality check performed within the air pressure sensors within the air pressure system fails, then an indicator is communicated indicating a failure within the air pressure sensors within the air pressure system.

9. The method of claim 7 wherein if the rationality check performed within the air pressure sensors within the air pressure system passes, then the first sensor, the second sensor, and the third sensor of the plurality of sensors is used to determine whether the malfunction condition is detected in the air pressure limiting valve of the vehicle.

\* \* \* \* \*